July 25, 1967 G. H. EASH 3,332,596

CONTROL MECHANISM FOR MAGNETIC TAPE MACHINE

Filed June 4, 1965 2 Sheets-Sheet 1

GEORGE H. EASH
INVENTOR.

KENDRICK, SUBOW and STOLZY
BY

ATTORNEYS

July 25, 1967 G. H. EASH 3,332,596

CONTROL MECHANISM FOR MAGNETIC TAPE MACHINE

Filed June 4, 1965 2 Sheets-Sheet 2

GEORGE H. EASH
INVENTOR.

KENDRICK, SUBKOW and STOLZY
BY [signature]
ATTORNEYS

United States Patent Office 3,332,596

Patented July 25, 1967

3,332,596

CONTROL MECHANISM FOR MAGNETIC TAPE MACHINE

George H. Eash, Los Angeles, Calif.
(3546 Alginet Drive, Encino, Calif. 91316)

Filed June 4, 1965, Ser. No. 461,268
3 Claims. (Cl. 226—183)

This invention relates to capstan drives for magnetic tape and more particularly to a control device for actuating such a drive.

In the past, a simple spring wire was used for the purpose of actuating a magnetic tape drive. One such device is shown at 40 in U.S. Patent No. 2,876,005 issued Mar. 3, 1959 to George H. Eash. This type of device has been operative but it is not accurately supplied with the predetermined amount of spring compression to a capstan drive shaft pressure roll.

In accordance with the present invention the above-described and other disadvantages of the prior art are overcome by providing a control mechanism for locking a magnetic tape machine pressure roll in a position against a capstan drive shaft in the machine. The machine is provided with a base on which the capstan drive is mounted. A resilient tape pressure roll is rotatably mounted on a stub shaft. A main shaft is fixed perpendicularly to the stub shaft. The main shaft is rotatable about its axis. In accordance with the present invention an arm is fixed to the main shaft and means are provided to clamp the arm in a position holding the roll against the capstan drive shaft.

In accordance with a feature of the present invention, the arm is made of spring metal, and an auxiliary shaft is provided on the base. The auxiliary shaft is rotatable on the base. A second arm is then provided which is fixed to the auxiliary shaft in a position to slide over and to wedge and bear against the spring arm as the auxiliary shaft is rotated.

According to another feature of the present invention, a plate is provided to bear against the second arm and means are also provided to adjust the position of the plate toward and away from the second arm. The plate provides means to limit the rotation of the second arm on the spring arm. This, in turn, provides means by which the compression of the pressure roll upon the capstan drive shaft may be adjusted.

The above-described and other advantages of the present invention will be better understood from the following description when considered in connection with the accompanying drawings.

In the drawings, which are to be regarded as merely illustrative:

Figure 1:
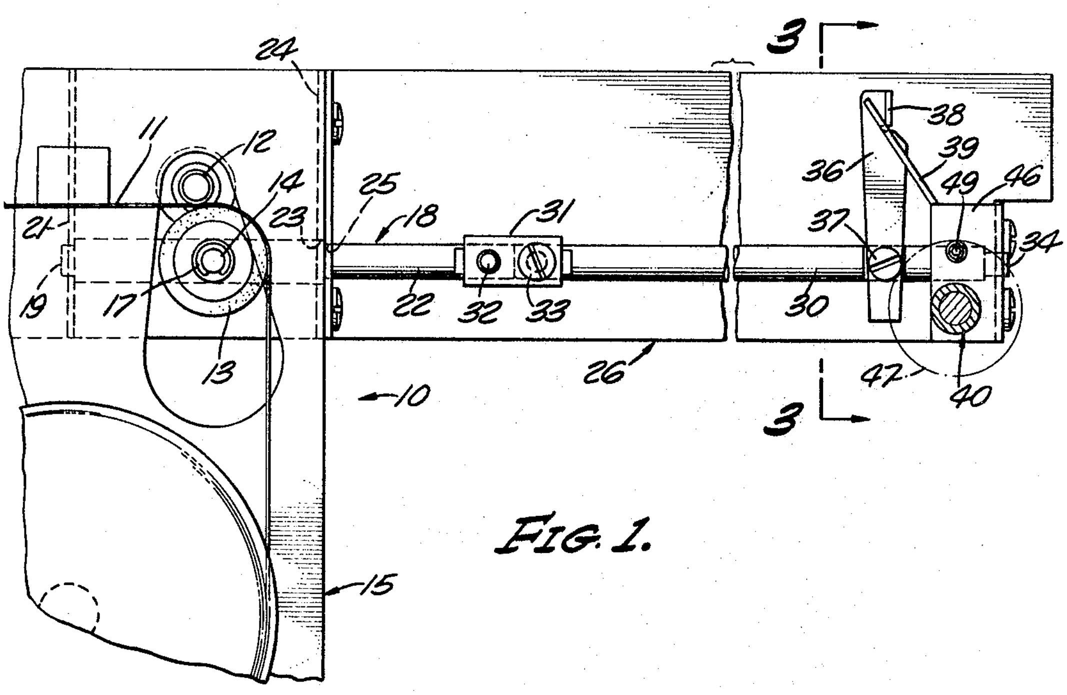
FIG. 1 is a top plan view partly in section of a magnetic tape machine and control mechanism therefor constructed in accordance with the present invention.

In FIG. 1 a conventional tape machine is indicated at 10. This machine may be of the type referred to in the said patent. A magnetic tape 11 in this case is driven by a capstan drive shaft 12 which operates against a rubber pressure roll 13.

Figure 2:
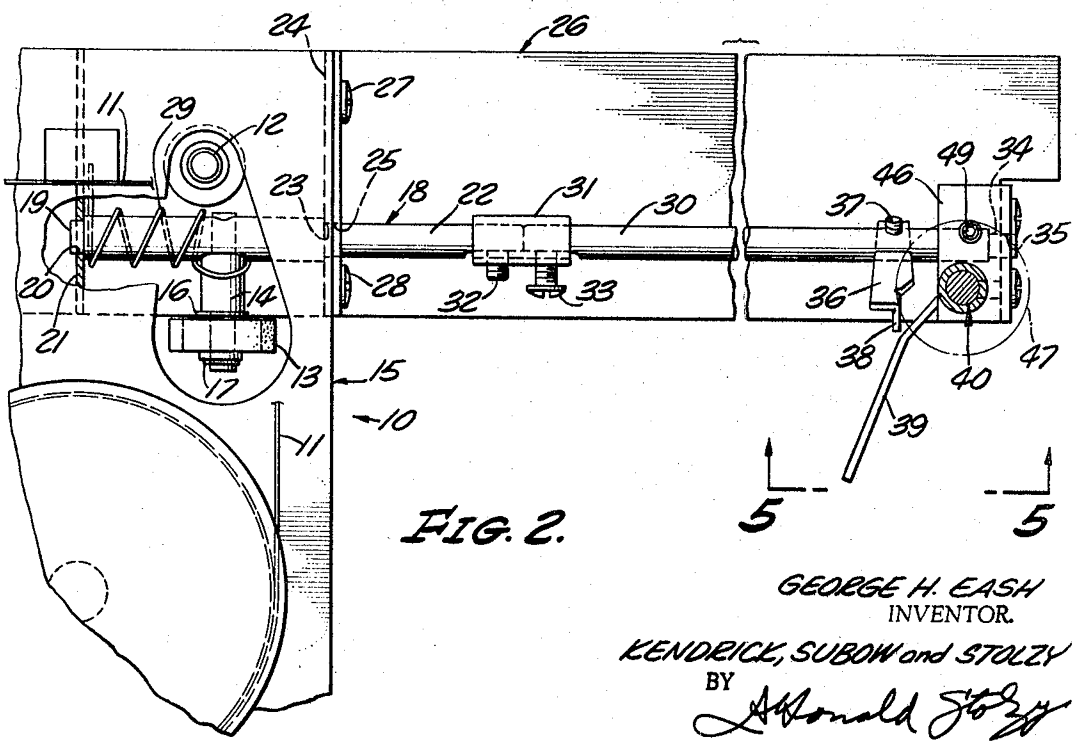
FIG. 2 is a top plan view of the magnetic tape machine and control mechanism in an inoperative position, the mechanism being shown in its operative position in FIG. 1.

As shown in FIG. 2, pressure roll 13 is retained upon a drive shaft 14 in a base 15. Pressure roll 13 is retained on drive shaft 14 by snap rings 16 and 17. Drive shaft 14 is fixed to a main shaft 18. Main shaft 18 is rotatable about its axis. It has a reduced end 19 in a hole 20 in a web 21 fixed to base 15. Main shaft 18 also has a reduced end 22 that is rotatable in a hole 23 in a side wall 24 of the base, and in a hole 25 of a bracket 26 fixed to base 15 by screws 27 and 28. Bracket 26 is employed to support the control mechanism of the present invention. All of the structures thus far described herein may be conventional with the exception of bracket 26 and screws 27 and 28. The same is true of a spring 29 which biases pressure roll 13 to a deactuated position shown in FIG. 2. Other structures to be described are not conventional.

Figure 3:
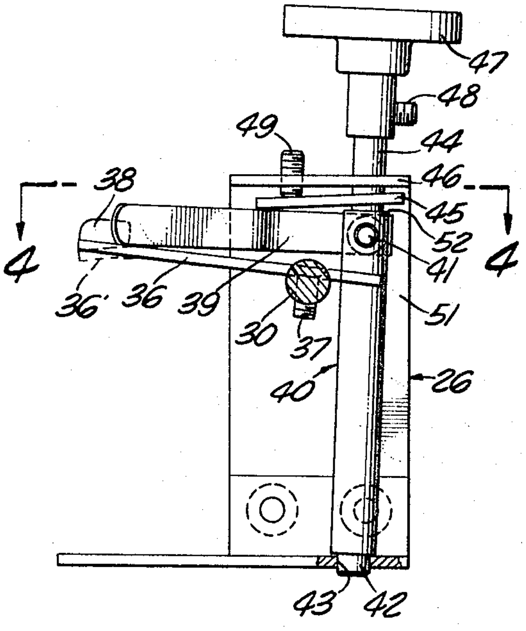
FIG. 3 is an enlarged sectional view of a portion of the control mechanism taken on the line 3—3 shown in FIG. 1.

In accordance with the present invention, main shaft 18 has an extension 30 fixed thereto by a ferrule 31 and set screws 32 and 33. Extension 30 has a reduced end portion 34 which is rotatable in a hole 35 in the right end of bracket 26. An arm 36 is fixed to extension 30 by a bolt 37. Arm 36 has a flange 38 bent out of the plane thereof to provide a stop for a second arm 39. However, as will be explained, arm 36 is made of spring metal and takes some deflection. As shown in FIG. 3, the angle that arm 39 makes with arm 36 is very small. For this reason, pressure roll 13 may be engaged with capstan drive shaft 12 by locating it a short distance spaced from stop 38.

Second arm 39 is fixed to an auxiliary shaft 40 that is rotatably mounted upon bracket 26. Second arm 39 is fixed to shaft 40 by a set screw 41. Auxiliary shaft 40 has a reduced end 42 which is rotatable in a hold 43 in bracket 26. Auxiliary shaft 40 also has a reduced end 44 which extends through a hole in a plate 45 and a hole in a flange 46 of bracket 26.

A control knob 47 is fixed to auxiliary shaft end 44 by a set screw 48.

Plate 45 bears against second arm 39 which when moved to the position shown in FIGS. 1 and 3 becomes wedged between plate 45 and spring arm 36.

Figure 4:
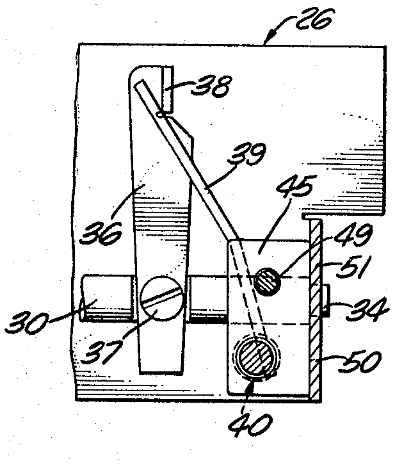
FIG. 4 is a transverse sectional view of the control mechanism taken on the line 4—4 shown in FIG. 3.
Figure 5:
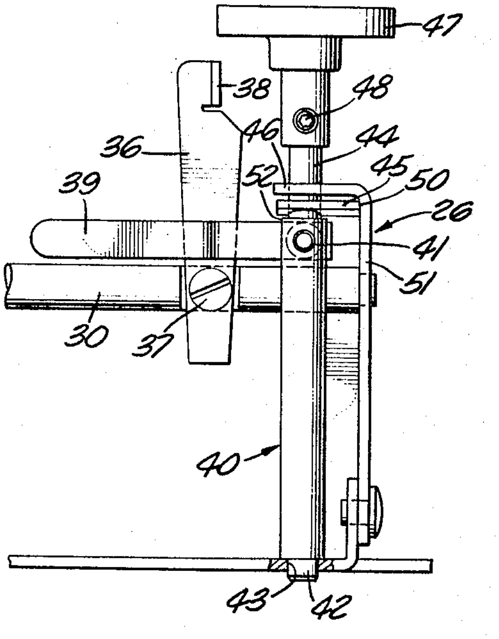
FIG. 5 is a side elevational view, partly in section, of a portion of the control mechanism taken on the line 5—5 shown in FIG. 2.

An adjustment screw 49 is threaded through bracket flange 46 and bears against plate 45. As shown in FIG. 4, plate 45 has an end edge 50 which rests flush with the internal surface of a portion 51 of bracket 26. Plate 45, therefore, does not turn substantially upon the axis of auxiliary shaft 40. The right end of plate 45, as shown in FIG. 3, may rest upon an enlarged portion 52 of auxiliary shaft 40.

Note will be taken that arm 36 may take a slight deflection exaggerated at 36′ in FIG. 3. Further, frictional engagement of arm 39 with arm 36 will hold arm 39 on arm 36 at a position spaced from arm stop 38, if desired.

It will be appreciated that although one specific control mechanism has been described and illustrated, other clamp means might be provided for spring arm 36, or some other means of clamping main shaft 18 may be provided without departing from the invention.

From the foregoing it will also be appreciated that the screw 49 may be adjusted to regulate the desired amount of compression of pressure roll 13 upon capstan drive shaft 12.

Although only one specific embodiment of the present invention has been described and illustrated herein, many changes and modifications will suggest themselves to those skilled in the art. A single embodiment has been selected for this disclosure for the purpose of illustration only. The present invention should, therefore, not be limited to the embodiment so selected, the true scope of the invention being defined only in the appended claims.

What is claimed is:

1. In a magnetic tape machine having a base capstan drive shaft, a resilient tape pressure roll rotatably mounted on a stub shaft, and a main shaft fixed perpendicularly thereto, said main shaft being rotatable about an axis perpendicular to that of the stub shaft, a releasable mechanism for locking said pressure roll in a position against said capstan drive shaft, said mechanism comprising: a spring metal arm fixed to said main shaft; an auxiliary shaft rotatable on said base; and a second arm fixed to said auxiliary shaft in a position to slide over and bear against said spring arm as said auxiliary shaft is rotated.

2. In a magnetic tape machine having a base capstan drive shaft, a resilient tape pressure roll rotatably mounted on a stub shaft, and a main shaft fixed perpendicularly thereto, said main shaft being rotatable about an axis perpendicular to that of the stub shaft, a releasable mechanism for locking said pressure roll in a position against said capstan drive shaft, said mechanism comprising: a first arm fixed to said main shaft; an auxiliary shaft rotatable on said base; and a second arm fixed to said auxiliary shaft in a position to slide over and bear against said first arm as said auxiliary shaft is rotated.

3. In a magnetic tape machine having a base capstan drive shaft, a resilient tape pressure roll rotatably mounted on a stub shaft, and a main shaft fixed perpendicularly thereto, said main shaft being rotatable about an axis perpendicular to that of the stub shaft, a releasable mechanism for locking said pressure roll in a position against said capstan drive shaft, said mechanism comprising: a first arm fixed to said main shaft; an auxiliary shaft rotatable on said base; a second arm fixed to said auxiliary shaft in a position to slide over and bear against said first arm as said auxiliary shaft is rotated; a plate to bear against said second arm; means to adjust the position of said plate toward and away from said second arm; and stop means fixed to said first arm for said second arm.

References Cited

UNITED STATES PATENTS 2,876,005 3/1959 Eash ............ 242—55.11
3,113,708 12/1963 Moulic ............ 242—55.19
3,154,956 11/1964 Eash ............ 226—181

M. HENSON WOOD, Jr., *Primary Examiner.*

J. N. ERLICH, *Assistant Examiner.*